US009086201B2

(12) United States Patent
Zhuang et al.

(10) Patent No.: US 9,086,201 B2
(45) Date of Patent: Jul. 21, 2015

(54) METHOD FOR CONTROLLING THE VEHICLE LIGHTING SYSTEM VIEWING ANGLES SYNCHRONIZING WITH THE TURNING ANGLES AND SYSTEM THEREOF

(71) Applicant: SHENZHEN PROTRULY ELECTRONICS CO., LTD., Shenzhen (CN)

(72) Inventors: Min Zhuang, Shenzhen (CN); Peng Lu, Shenzhen (CN)

(73) Assignee: SHENZHEN PROTRULY ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 13/958,359

(22) Filed: Aug. 2, 2013

(65) Prior Publication Data

US 2014/0218952 A1  Aug. 7, 2014

(30) Foreign Application Priority Data

Feb. 1, 2013  (CN) .......................... 2013 1 0040253

(51) Int. Cl.
*B60Q 1/12* (2006.01)
*B60Q 1/00* (2006.01)
*F21V 21/28* (2006.01)
*F21S 8/10* (2006.01)

(52) U.S. Cl.
CPC . *F21S 48/17* (2013.01); *B60Q 1/12* (2013.01); *B60Q 2300/054* (2013.01); *B60Q 2300/122* (2013.01)

(58) Field of Classification Search
CPC ............. F21S 48/17; B60Q 1/12; B60Q 1/00; B60Q 1/14

USPC .............. 362/466, 43, 464, 465, 40, 346, 37, 362/304, 523; 315/79
See application file for complete search history.

(56) References Cited

U.S. PATENT DOCUMENTS

| 4,733,333 | A  | * | 3/1988  | Shibata et al. .................. 362/40 |
| 5,404,278 | A  | * | 4/1995  | Shibata et al. ................. 362/464 |
| 6,366,024 | B1 | * | 4/2002  | Jonner et al. .................... 315/82 |
| 7,153,007 | B2 | * | 12/2006 | Fukawa et al. ................. 362/465 |
| 7,445,582 | B2 | * | 11/2008 | Hardtle ......................... 477/176 |
| 7,815,352 | B2 | * | 10/2010 | Naganawa et al. ........... 362/523 |
| 8,425,092 | B2 | * | 4/2013  | Kobayashi .................... 362/466 |
| 8,436,747 | B2 | * | 5/2013  | Schoepp ....................... 340/903 |
| 8,760,632 | B2 | * | 6/2014  | Usami .......................... 356/3.14 |

(Continued)

*Primary Examiner* — Douglas W Owens
*Assistant Examiner* — Wei Chan
(74) *Attorney, Agent, or Firm* — Muncy, Geissler, Olds & Lowe, P.C.

(57) ABSTRACT

A method for controlling the vehicle lighting system viewing angles synchronizing with the turning angles and system thereof, comprising: obtaining a current vehicle turning angle signal, transforming it into current turning angle value; finding out the specific lighting system illumination angle synchronizing with a turning angle range according to the value; then controlling the lighting system switching to the found specific synchronizing illumination angle, achieving synchronization between viewing angles and turning angles. Through synchronizing with turning angles, the system automatically controls the lighting system spotlight degrees, thus controls the illumination angles, and brings a wide range visual effect to drivers. Without driver's extra operations, the system can automatically adjust the lighting system illumination angles according to different turning angles, thus adjust the driver's viewing angle sizes, further improves the driving safety.

9 Claims, 2 Drawing Sheets

(56) References Cited

U.S. PATENT DOCUMENTS

| | | | |
|---|---|---|---|
| 2001/0012206 A1* | 8/2001 | Hayami et al. | 362/464 |
| 2003/0123705 A1* | 7/2003 | Stam et al. | 382/104 |
| 2004/0228139 A1* | 11/2004 | Taniuchi | 362/539 |
| 2005/0018438 A1* | 1/2005 | Fukawa et al. | 362/466 |
| 2008/0045379 A1* | 2/2008 | Hardtle | 477/74 |
| 2009/0072996 A1* | 3/2009 | Schoepp | 340/903 |
| 2010/0052550 A1* | 3/2010 | Kobayashi | 315/158 |
| 2012/0123638 A1* | 5/2012 | Bechtel et al. | 701/36 |
| 2012/0192784 A1* | 8/2012 | Gimlan et al. | 116/200 |
| 2012/0275172 A1* | 11/2012 | Mizuno | 362/464 |
| 2013/0080019 A1* | 3/2013 | Isaji et al. | 701/96 |
| 2014/0232265 A1* | 8/2014 | Masuda et al. | 315/82 |

* cited by examiner

METHOD FOR CONTROLLING THE VEHICLE LIGHTING SYSTEM VIEWING ANGLES SYNCHRONIZING WITH THE TURNING ANGLES AND SYSTEM THEREOF

CROSS-REFERENCES TO RELATED APPLICATIONS

This application claims the priority of Chinese patent application no. 201310040253.7, filed on Feb. 1, 2013, the entire contents of all of which are incorporated herein by reference.

FIELD OF THE INVENTION

The present invention relates to the field of automotive electronics, and more particularly to method for controlling the vehicle lighting system viewing angles synchronizing with the turning angles and system thereof.

BACKGROUND

With the development of science and technology as well as the improvement of people's living standards, driving automobiles is becoming more and more popular, and more and more families have owned their automobiles.

The existing vehicle loaded lighting system adjusts its illumination intensity according to the position of its filamentary cathode. When the filamentary cathode of a high beam light locates on the focus of the bulb, light emitted will be in parallel and more concentrated, thus owning a better brightness, which makes it be able to illuminate objects higher and farther, while the filamentary cathode of a low beam light locates outside the focus of the bulb (between 1 and 2 times of the focal length), light emitted will be divergent and will be able to illuminate a larger scope nearby.

The vehicle lighting system in the prior art, wherein, when the vehicle is in driving, the lighting system illumination angle is always keeping a fixed number, which can't satisfy the driver's requirements on the viewing angles changing with the vehicle turning angles dynamically. Especially when a vehicle is making turns at night, due to the fixed illumination angle, its driver's viewing angle is relatively narrow, and it is impossible for the driver to observe the circumstances around the turning vehicle in a wide range, thus some security risks exist.

Therefore, the prior art needs to be improved and developed.

BRIEF SUMMARY OF THE DISCLOSURE

The technical problems to be solved in the present invention is, aiming at the defects of the prior art, providing a method for controlling the vehicle lighting system viewing angles synchronizing with the turning angles and a system thereof, which adds a new function to the vehicle loaded lighting system, i.e., its viewing angles synchronizing with the vehicle turning angles, thus the present invention improves the driving safety and provides convenience to users.

The technical solution of present invention to solve the said technical problems is as follows:

A method for controlling the vehicle lighting system viewing angles synchronizing with the turning angles and system thereof, comprising:

A. turning on a synchronization function that makes the illumination angles of the vehicle lighting system synchronize with the vehicle turning angles, after receiving the user's corresponding operation commands;

B. obtaining a current vehicle turning angle signal, and transforming the current vehicle turning angle signal into a current turning angle value; then determining the turning angle range according to the current turning angle value;

C. based on the determined turning angle range, looking up a prestored correspondence relationship table of lighting system illumination angles synchronizing with each turning angle range, finding out the specific lighting system illumination angle synchronizing with the current vehicle turning angle range according to the current turning angle value, under the current driving conditions;

Then controlling the lighting system switching to the found specific illumination angle synchronizing with the current vehicle turning angle range, and achieving synchronization between the illumination angle and the turning angle range.

The said method for controlling the vehicle lighting system viewing angles synchronizing with the turning angles, wherein, the illumination angle includes a horizontal spotlight angle and a vertical spotlight angle of the vehicle lighting system, wherein, the said horizontal spotlight angle is an illumination range angle of the vehicle lighting system on a horizontal surface, and the said vertical spotlight angle is an illumination range angle of the vehicle lighting system on a vertical surface.

The said method for controlling the vehicle lighting system viewing angles synchronizing with the turning angles, wherein, before the said step A, it also comprises:

S: preinstall and prestore the correspondence relationship table of lighting system illumination angles synchronizing with the vehicle turning angle ranges.

The said method for controlling the vehicle lighting system viewing angles synchronizing with the turning angles, wherein, the said step C comprises the following steps in details:

When the vehicle turning angle range is less than 15 degrees, control the horizontal spotlight angle of the lighting system illumination angle to be 120 degrees, and the vertical spotlight angle to be 56 degrees;

When the vehicle turning angle range is between 15 and 19 degrees, control the horizontal spotlight angle of the lighting system illumination angle to be 130 degrees, and the vertical spotlight angle to be 55 degrees;

When the vehicle turning angle range is between 20 and 24 degrees, control the horizontal spotlight angle of the lighting system illumination angle to be 140 degrees, and the vertical spotlight angle to be 54 degrees;

When the vehicle turning angle range is between 25 and 29 degrees, control the horizontal spotlight angle of the lighting system illumination angle to be 150 degrees, and the vertical spotlight angle to be 53 degrees;

When the vehicle turning angle range is between 30 and 34 degrees, control the horizontal spotlight angle of the lighting system illumination angle to be 160 degrees, and the vertical spotlight angle to be 52 degrees;

When the vehicle turning angle range is between 35 and 39 degrees, control the horizontal spotlight angle of the lighting system illumination angle to be 170 degrees, and the vertical spotlight angle to be 51 degrees;

When the vehicle turning angle range is between 40 and 44 degrees, control the horizontal spotlight angle of the lighting system illumination angle to be 175 degrees, and the vertical spotlight angle to be 50 degrees; and When the vehicle turning angle is no less than 45 degrees, control the horizontal spotlight angle of the lighting system illumination angle to be 179 degrees, and the vertical spotlight angle to be 50 degrees.

The said method for controlling the vehicle lighting system viewing angles synchronizing with the turning angles, wherein, the said step B further comprises: obtaining the current vehicle turning angle signal through the CAN bus and/or OBD.

The said method for controlling the vehicle lighting system viewing angles synchronizing with the turning angles, wherein, the said step C further comprises: when the vehicle turning angle is 18 degrees, control the horizontal spotlight angle of the lighting system illumination angle to be136 degrees, and vertical spotlight angle to be 54.4 degrees;

The said method for controlling the vehicle lighting system viewing angles synchronizing with the turning angles wherein, the said step C further comprises:

Based on the determined current vehicle turning angle range, control both the vehicle lighting system illumination angle and the luminous power synchronizing with the turning angle.

The said method for controlling the vehicle lighting system viewing angles synchronizing with the turning angles, wherein, the said step C further includes: when the turning angle increases, control the electronic power increasing accordingly, in order to improve the illumination intensity.

A system for controlling the vehicle lighting system viewing angles synchronizing with the turning angles, comprising:

a receiving module, configured to receive a user's operation commands to turn on the synchronization function that makes the vehicle lighting system illumination angle synchronize with the vehicle turning angle;

an obtaining and determining module, configured to obtain the current vehicle turning angle signal, and transform the current vehicle turning angle signal into the current turning angle value, followed by determining its turning angle range according to the current turning angle value; and a controlling module, configured to look up the prestored correspondence relationship table of lighting system illumination angles synchronizing with each turning angle range, and find out the specific illumination angle synchronizing with the current turning angle range according to the current turning angle value, under the current driving conditions; then control the vehicle lighting system switching to the found specific illumination angle synchronizing with the current turning angle range, thus achieve the synchronization between the illumination angles and the vehicle turning angles.

The said system for controlling the vehicle lighting system viewing angles synchronizing with the turning angles, wherein, it further comprises:

an installation and storage module, configured to preinstall a correspondence relationship table of lighting system illumination angle synchronizing with each turning angle range, and prestore the table.

an auxiliary controlling module, configured to control the vehicle lighting system illumination angle and luminous power synchronizing with the turning angle, based on the determined current turning angle range; when the turning angle increases, control the electronic power increasing accordingly, thus increase the illumination intensity;

The said illumination angle includes a horizontal spotlight angle and a vertical spotlight angle of the vehicle lighting system, wherein, the said horizontal spotlight angle is an illumination range angle of the vehicle lighting system on a horizontal surface, and the said vertical spotlight angle is an illumination range angle of the vehicle lighting system on a vertical surface.

The said method for controlling the vehicle lighting system viewing angles synchronizing with the turning angles and system thereof as provided in the present invention, wherein, by synchronizing with the vehicle turning angle, it automatically controls the lighting system's spotlight degree, thus controls the illumination angle, and brings a wider range visual effect to the driver, therefore, improves the driving safety.

Without any extra operations from the user during driving, the said system is able to adjust the lighting system illumination angles automatically according to different turning angles, thus adjust the viewing angle sizes, and greatly improves the driving safety.

DETAILED DESCRIPTION

In order to make the purpose, technical solution and the advantages of the present invention clearer and more explicit, further detailed descriptions of the present invention is stated here, referencing to the attached drawings and some embodiments of the present invention. It should be understood that the detailed embodiments of the invention described here are used to explain the present invention only, instead of limiting the present invention.

Figure 1:
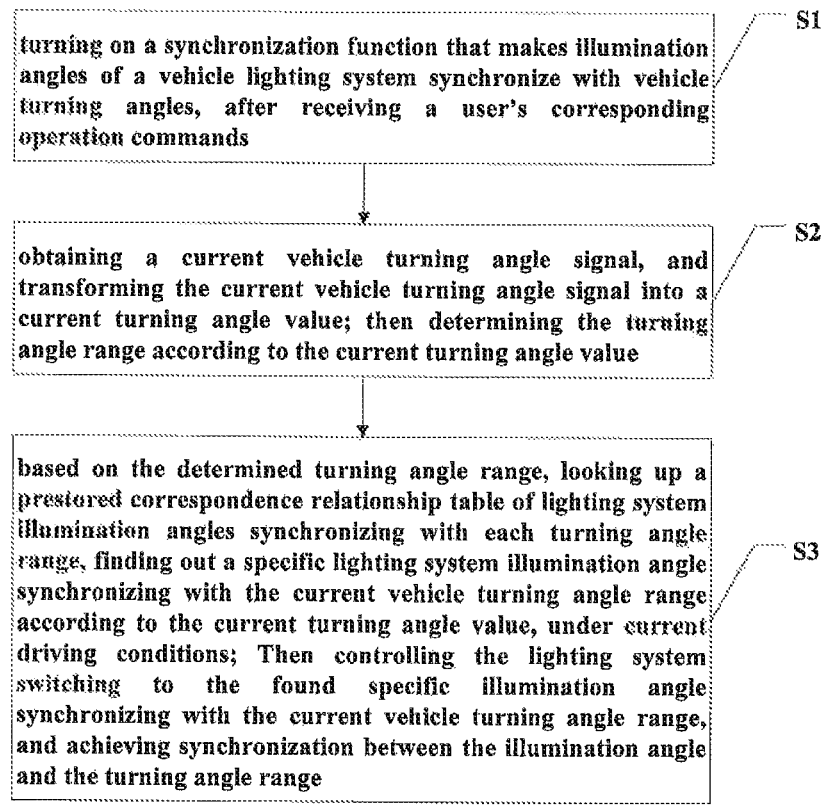
FIG. 1 illustrates a flow chart of a preferred embodiment of the method for controlling the vehicle lighting system viewing angles synchronizing with the turning angles in the present invention.

Refer to FIG. 1, which is the flow chart of a preferred embodiment of the method for controlling the vehicle lighting system viewing angles synchronizing with the turning angles in the present invention, the said controlling method comprises the following steps:

S1. turning on a synchronization function that makes the illumination angles of the vehicle lighting system synchronize with the vehicle turning angles, after receiving the user's corresponding operation commands. In specific implementations, a user's operation interface can be preinstalled in the vehicle, configured for users to turn on or turn off the said synchronous function between the lighting system illumination angle and the vehicle turning angle, such as, receiving the user's operation commands through current key buttons in the vehicle or through a touch screen, then turning on or turning off the said synchronous function between the lighting system illumination angle and the vehicle turning angle.

Figure 2:
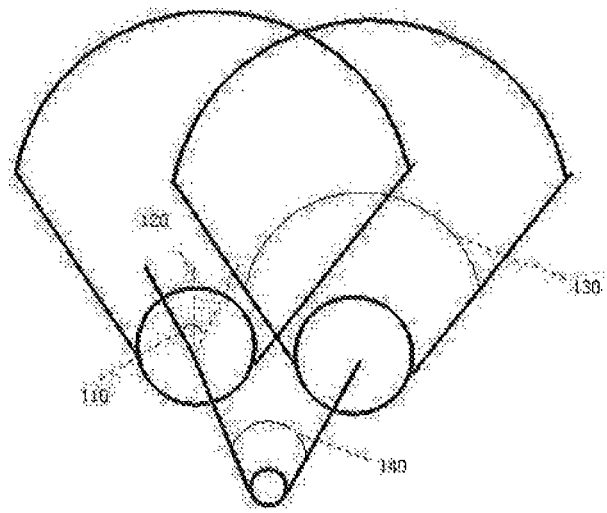
FIG. 2 illustrates a diagram of the illumination angles in the method for controlling the vehicle lighting system viewing angles synchronizing with the turning angles in the present invention.

Preferably, the said illumination angle in the present embodiment includes a horizontal spotlight angle 130 and a vertical spotlight angle 110 of the vehicle lighting system, as shown in FIG. 2 (wherein, 140 is the human viewing range, and 120 is the horizontal line); the said horizontal spotlight angle is an illumination range angle of the vehicle lighting system on a horizontal surface, and the said vertical spotlight angle is an illumination range angle of the vehicle lighting system on a vertical surface.

S2. obtaining a current vehicle turning angle signal, and transforming the current vehicle turning angle signal into a current turning angle value; then determining the turning angle range according to the current turning angle value, wherein, the current vehicle turning angle signal can be achieved using CAN bus and/or OBD and for other methods.

S3. based on the determined turning angle range, looking up the prestored correspondence relationship table of lighting system illumination angle synchronizing with each turning angle range, finding out the specific lighting system illumination angle synchronizing with the current vehicle turning angle range according to the current turning angle value, under the current driving conditions; then control the lighting system switching to the found specific illumination angle synchronizing with the current turning angle range, and achieve the synchronization between illumination angles and turning angles.

It needs to be specifically explained here, before the said step S1, a correspondence relationship table of the lighting system illumination angle synchronizing with the vehicle turning angle range, shall be preinstalled and prestored. In the present embodiment, the said preinstalled correspondence relationship table is shown in table 1.

TABLE 1

| | Turning angle (°) | | | | | | | |
|---|---|---|---|---|---|---|---|---|
| | <=15 | 15-19 | 20-24 | 25-29 | 30-34 | 35-39 | 40-44 | >=45 |
| Horizontal spotlight angle (°) | 120 | 130 | 140 | 150 | 160 | 170 | 175 | 179 |
| vertical spotlight angle (°) | 56 | 55 | 54 | 53 | 52 | 51 | 50 | 50 |

Based on the table 1, it can be concluded that:

when the current vehicle turning angle is less than 15 degrees, control the horizontal spotlight angle of the lighting system illumination angle to be 120 degrees, and the vertical spotlight angle to be 56 degrees;

when the current vehicle turning angle range is between 15 and 19 degrees, control the horizontal spotlight angle of the lighting system illumination angle to be 130 degrees, and the vertical spotlight angle to be 55 degrees;

when the current vehicle turning angle range is between 20 and 24 degrees, control the horizontal spotlight angle of the lighting system illumination angle to be 140 degrees, and the vertical spotlight angle to be 80 degrees;

when the current vehicle turning angle range is between 25 and 29 degrees, control the horizontal spotlight angle of the lighting system illumination angle to be 150 degrees, and the vertical spotlight angle to be 53 degrees;

when the current vehicle turning angle range is between 30 and 34 degrees, control the horizontal spotlight angle of the lighting system illumination angle to be 160 degrees, and the vertical spotlight angle to be 52 degrees;

when the current vehicle turning angle range is between 35 and 39 degrees, control the horizontal spotlight angle of the lighting system illumination angle to be 170 degrees, and the vertical spotlight angle to be 51 degrees;

when the current vehicle turning angle range is between 40 and 44 degrees, control the horizontal spotlight angle of the lighting system illumination angle to be 175 degrees, and the vertical spotlight angle to be 50 degrees; and when the current vehicle turning angle is no less than 45 degrees, control the horizontal spotlight angle of the lighting system illumination angle to be 179 degrees, and the vertical spotlight angle to be 50 degrees.

In real applications, in order to automatically adjust the lighting system illumination angles more precisely according to different turning angles, so as to adjust the viewing angles, the said horizontal spotlight angles and vertical spotlight angles are also possible to be configured in certain ranges. For example, when the current vehicle turning angle range is between 15 and 19 degrees, the horizontal spotlight angle of the lighting system illumination angle is controlled between 130 and 139 degrees, and the vertical spotlight angle to be between 54.1 and 55 degrees. Same arguments are also applied to other vehicle turning angle ranges, where, both horizontal and vertical spotlight angles are configured in the corresponding ranges.

As stated in the above embodiments, after the user turns on the said synchronization function of lighting system illumination angle synchronizing with the turning angles, the current turning angles will be obtained automatically when the vehicle is making a turn. For example, when the said turning angle is 18 degrees, look up the prestored correspondence relationship table of lighting system illumination angle synchronizing with each turning angle range and find out the specific horizontal and vertical spotlight angles, then control the lighting system horizontal spotlight angle to be 136 degrees, and vertical spotlight angle to be 54.4 degrees, thus, achieve the synchronization between the driver's viewing angles and the vehicle turning angles.

Preferably, based on the determined current turning angle range, it is also possible to control both the vehicle lighting system illumination angle and luminous power synchronizing with the turning angle. That is, at the same time when the viewing angle is synchronizing with the turning angle, according to the energy conservation principle, for a constant power, the larger the illumination angle is (the larger the spotlight angel is), the weaker the luminous intensity is. Therefore, it is possible to increase the electric power thus to increase the luminous intensity, when the turning angle is large.

Figure 3:
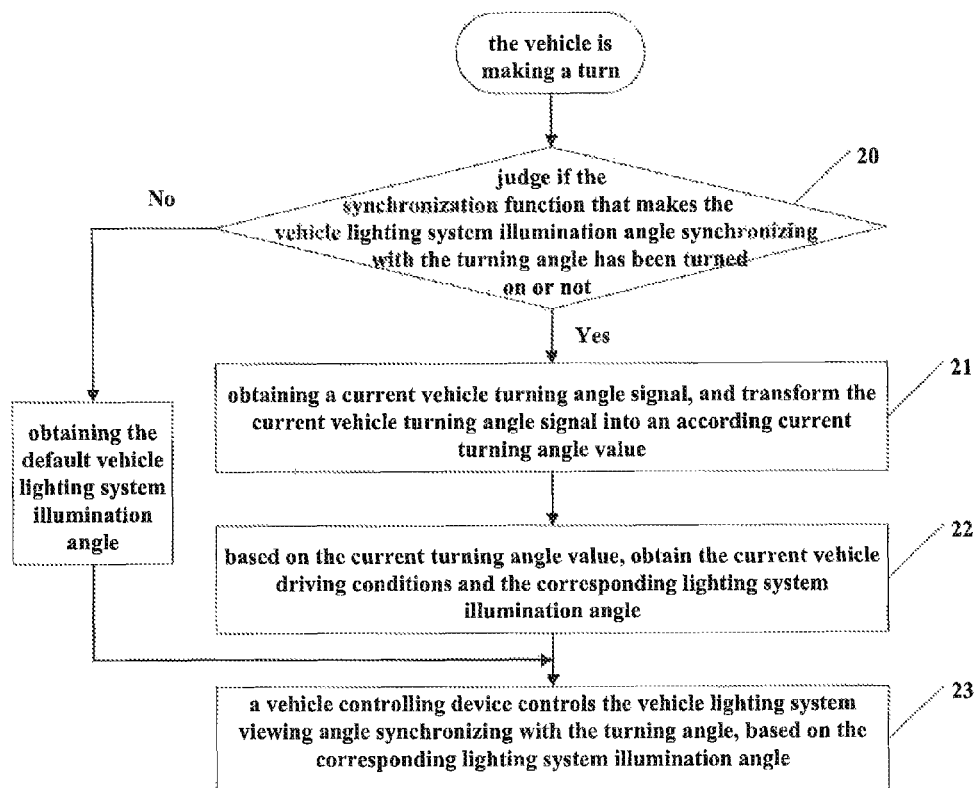
FIG. 3 illustrates a detailed flow chart of achieving the synchronization between the lighting system illumination angles and the vehicle turning angles in the present invention.

In order to better understand the method for controlling the vehicle lighting system viewing angles synchronizing with the turning angles as stated in the above embodiment in the present invention, when vehicle is making turns, the detailed flow chart of the controlling method is referred to FIG. 3, and details are stated below:

When the vehicle is making a turn, starts from the step 20:

Step 20: Judge if the synchronization function that makes the vehicle lighting system illumination angle synchronizing with the turning angle has been turned on or not; if yes, then go to the next step, i.e., step 21; if no, obtain the default illumination angle of the vehicle lighting system, and go to step 23;

Step 21. obtaining a current vehicle turning angle signal, and transform the current vehicle turning angle signal into an according current turning angle value;

Step 22. based on the current turning angle value, obtain the current vehicle driving conditions and the corresponding lighting system illumination angle;

Step 23. a vehicle controlling device (such as a motor, a magnetic inducing device, and else) controls the vehicle lighting system viewing angles synchronizing with the turning angles, based on the corresponding lighting system illumination angles.

So, through the above said method for controlling the vehicle lighting system viewing angles synchronizing with the turning angles, when the vehicle is making turns, without any extra operations from the user, the vehicle can adjust its lighting system spotlight degree automatically, based on different turning angles, thus adjust its illumination angles. A DongFeng Citroen car is selected to act as a test object and the method as stated in the present invention is applied and tested, wherein, the matching parameters between the vehicle turning angels and the horizontal spotlight angles, as well as that between the vehicle turning angels and the vertical spotlight angles are listed in table 1. The experiment shows, after modifications, the viewing ranges are increased when the vehicle is making turns, especially the driver's viewing effects get significantly improved during night driving, which brings a better observation to surrounding circumstances, when the vehicle is making turns, thus improves the driving safety.

Figure 4:
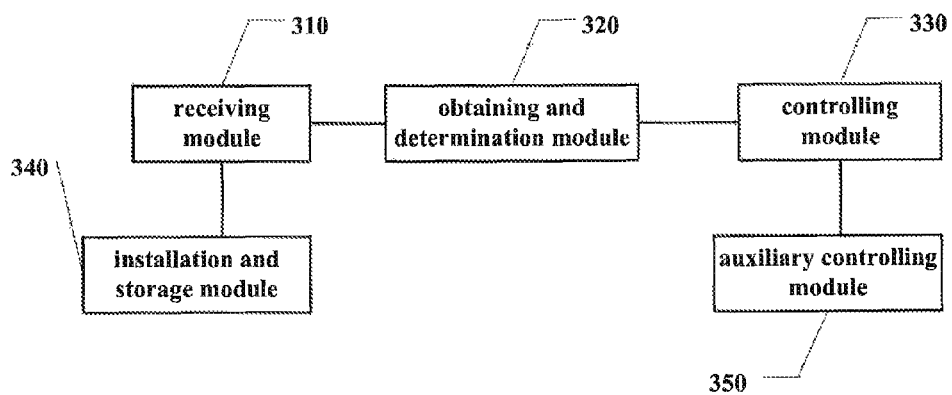
FIG. 4 illustrates a structural block diagram of the system for controlling the vehicle lighting system viewing angles synchronizing with the turning angles in the present invention.

Based on the embodiments listed above, the present invention further provides a system for controlling the vehicle lighting system viewing angles synchronizing with the turning angles, as shown in FIG. 4, the said system includes:

a receiving module 310, configured to turn on the synchronization function that makes lighting system illumination angles synchronizing with the turning angles after receiving the user's operation commands; Details have been stated in the embodiments listed above.

an obtaining and determination module 320, configured to obtain the current vehicle turning angle signal, and transform the current vehicle turning angle signal into the current turning angle value; then determine the current turning angle range according to the current turning angle value. Details have also been stated in the embodiments listed above.

a controlling module 330, configured to look up the prestored correspondence relationship table of lighting system illumination angles synchronizing with the turning angle ranges, and find out the specific illumination angle synchronizing with current turning angle range according to each turning angle value, under the current driving conditions; then control the vehicle lighting system switching to the found specific illumination angle synchronizing with the current turning angle range, and achieve the synchronization between the illumination angles and the turning angles. Details have also been stated in the embodiment listed above.

The above said system for controlling the vehicle lighting system viewing angles synchronizing with the turning angles further includes:

an installation and storage module 340, configured to pre-install a correspondence relationship table of lighting system illumination angles synchronizing with each turning angle range and prestore the table. Details have been stated in the embodiments listed above.

an auxiliary controlling module 350, configured to control the vehicle lighting system illumination angles and luminous powers synchronizing with the turning angles, based on the determined current turning angle ranges; in the case of the turning angle increases, control the electric power increasing accordingly, so as to increase the illumination intensity. Details have been stated in the embodiments listed above.

Preferably, wherein, the said illumination angle includes a horizontal spotlight angle and a vertical spotlight angle of the vehicle lighting system, wherein, the said horizontal spotlight angle is an illumination range angle of the vehicle lighting system on a horizontal surface, and the said vertical spotlight angle is an illumination range angle of the vehicle lighting system on a vertical surface. Details have been stated in the embodiments listed above.

In summary, the method for controlling the vehicle lighting system viewing angles synchronizing with the turning angles and the system thereof in the present invention, wherein, when the vehicle is making a turn, if the said synchronizing function of the lighting system illumination angle synchronizing with the vehicle turning angle has not been turned on, then the controlling system obtains the default vehicle lighting system illumination angle; if the synchronizing function has been turned on, then through the synchronization with the turning angle, the controlling system automatically controls the lighting system spotlight degree, thus controls the illumination angles, and brings a wide range visual effect to the driver, therefore, the driving safety gets improved. Furthermore, the user needs no extra operations during driving, the system can automatically adjust the lighting system illumination angles according to different turning angles, thus adjust the viewing angle sizes, further improves the driving safety.

It should be understood that, the application of the present invention is not limited to the above examples listed. It will be possible for a person skilled in the art to make modifications or replacements according to the above descriptions, which shall all fall within the scope of the appended claims of the present invention.

What is claimed is:

1. A method for controlling vehicle lighting system viewing angles synchronizing with turning angles, comprising:
   A. turning on a synchronization function that makes illumination angles of a vehicle lighting system synchronize with vehicle turning angles, after receiving a user's corresponding operation commands;
   B. obtaining a current vehicle turning angle signal, and transforming the current vehicle turning angle signal into a current turning angle value; then determining the turning angle range according to the current turning angle value;
   C. based on the determined turning angle range, looking up a prestored correspondence relationship table of lighting system illumination angles synchronizing with each turning angle range, finding out a specific lighting system illumination angle synchronizing with the current vehicle turning angle range according to the current turning angle value, under current driving conditions; then controlling the lighting system switching to the found specific illumination angle synchronizing with the current vehicle turning angle range, and achieving synchronization between the illumination angle and the turning angle range,
   wherein, the step C further comprises the following steps:
   when the vehicle turning angle is less than 15 degrees, control the horizontal spotlight angle of the lighting system illumination angle to be 120 degrees, and the vertical spotlight angle to be 56 degrees;
   when the vehicle turning angle range is between 15 and 19 degrees, control the horizontal spotlight angle of the lighting system illumination angle to be 130 degrees, and the vertical spotlight angle to be 55 degrees;
   when the vehicle turning angle range is between 20 and 24 degrees, control the horizontal spotlight angle of the lighting system illumination angle to be 140 degrees, and the vertical spotlight angle to be 54 degrees;
   when the vehicle turning angle range is between 25 and 29 degrees, control the horizontal spotlight angle of the lighting system illumination angle to be 150 degrees, and the vertical spotlight angle to be 53 degrees;
   when the vehicle turning angle range is between 30 and 34 degrees, control the horizontal spotlight angle of the lighting system illumination angle to be 160 degrees, and the vertical spotlight angle to be 52 degrees;

when the vehicle turning angle range is between 35 and 39 degrees, control the horizontal spotlight angle of the lighting system illumination angle to be 170 degrees, and the vertical spotlight angle to be 51 degrees;

when the vehicle turning angle range is between 40 and 44 degrees, control the horizontal spotlight angle of the lighting system illumination angle to be 175 degrees, and the vertical spotlight angle to be 50 degrees; and when the vehicle turning angle is no less than 45 degrees, control the horizontal spotlight angle of the lighting system illumination angle to be 179 degrees, and the vertical spotlight angle to be 50 degrees.

2. The said method for controlling the vehicle lighting system viewing angles synchronizing with the turning angles according to claim 1, wherein, the said illumination angle includes a horizontal, spotlight angle and a vertical spotlight angle of the vehicle lighting system, wherein, the said horizontal spotlight angle is an illumination range angle of the vehicle lighting system on a horizontal surface, and the said vertical spotlight angle is an illumination range angle of the vehicle lighting system on a vertical surface.

3. The said method for controlling the vehicle lighting system viewing angles synchronizing with the turning angles according to claim 1, wherein, before the said step A, it also comprises:
   S. preinstall and prestore the correspondence relationship table of the vehicle lighting system illumination angles synchronizing with the vehicle turning angles.

4. The said method for controlling the vehicle lighting system viewing angles synchronizing with the turning angles, according to claim 1, wherein, the said step B further comprises: obtaining the current vehicle turning angle signal through CAN bus and/or OBD.

5. The said method for controlling the vehicle lighting system viewing angles synchronizing with the turning angles according to claim 1, wherein, the said step C further comprises: when the vehicle turning angle is 18 degrees, control the horizontal spotlight angle of the lighting system illumination angle to be 136 degrees, and the vertical spotlight angle to be 54.4 degrees.

6. The said method for controlling the vehicle lighting system viewing angles synchronizing with the turning angles according to claim 1, wherein, the said step C further comprises:
   based on the determined current vehicle turning angle range, control both the vehicle lighting system illumination angle and the luminous power synchronizing with the turning angle.

7. The said method for controlling the vehicle lighting system viewing angles synchronizing with the turning angles according to claim 1, wherein, the said step C further comprises: when the vehicle turning angle increases, control electric power increasing accordingly, so as to improve the illumination intensity.

8. A system for controlling vehicle lighting system viewing angles synchronizing with turning angles, comprising:
   a receiving module, configured to receive a user's operation commands and turn on a synchronization function that makes vehicle lighting system illumination angles synchronize with vehicle turning angles;
   an obtaining and determination module, used to obtain a current vehicle turning angle signal, and transform the current vehicle turning angle signal into a current turning angle value, and then determine a turning angle range according to the current turning angle value; and
   a controlling module, configured to look up a prestored corresponding relationship table of lighting system illumination angles synchronizing with each turning angle range, and find out a specific illumination angle synchronizing with the current turning angle range according to the current turning angle value, under the current driving conditions; then control the vehicle lighting system switching to the found specific illumination angle synchronizing with the current turning angle range, and achieve the synchronization between the illumination angles and the vehicle turning angles, wherein the illumination angle includes a horizontal spotlight angle and a vertical spotlight angle of the vehicle lighting system, wherein, the horizontal spotlight angle is an illumination range angle of the vehicle lighting system on a horizontal surface, and the vertical spotlight angle is an illumination range angle of the vehicle lighting system on a vertical surface, wherein the controlling module finds out the specific illumination angle according to the following steps:

when the vehicle turning angle is less than 15 degrees, control the horizontal spotlight angle of the lighting system illumination angle to be 120 degrees, and the vertical spotlight angle to be 56 degrees;

when the vehicle turning angle range is between 15 and 19 degrees, control the horizontal spotlight angle of the lighting system illumination angle to be 130 degrees, and the vertical spotlight angle to be 55 degrees;

when the vehicle turning angle range is between 20 and 24 degrees, control the horizontal spotlight angle of the lighting system illumination angle to be 140 degrees, and the vertical spotlight angle to be 54 degrees;

when the vehicle turning angle range is between 25 and 29 degrees, control the horizontal spotlight angle of the lighting system illumination angle to be 150 degrees, and the vertical spotlight angle to be 53 degrees;

when the vehicle turning angle range is between 30 and 34 degrees, control the horizontal spotlight angle of the lighting system illumination angle to be 160 degrees, and the vertical spotlight angle to be 52 degrees;

when the vehicle turning angle range is between 35 and 39 degrees control the horizontal spotlight angle of the lighting system illumination angle to be 170 degrees, and the vertical spotlight angle to be 51 degrees;

when the vehicle turning angle range is between 40 and 44 degrees, control the horizontal spotlight angle of the lighting system illumination angle to be 175 degrees, and the vertical spotlight angle to be 50 degrees; and when the vehicle turning angle is no less than 45 degrees, control the horizontal spotlight angle of the lighting system illumination angle to be 179 degrees, and the vertical spotlight angle to be 50 degrees.

9. The said system for controlling the vehicle lighting system viewing angles synchronizing with the turning angles according to claim 8, wherein, it further comprises:
   an installation and storage module, configured to preinstall the correspondence relationship table of the lighting system illumination angles synchronizing with each turning angle range and prestore the table;
   an auxiliary controlling module, configured to control the vehicle lighting system illumination angles and luminous powers synchronizing with the vehicle turning angles, based on the determined current turning angle ranges; in the case of the turning angle increases, control the electric power increasing accordingly, so as to increase the illumination intensity.

* * * * *